(12) United States Patent
Furlotti et al.

(10) Patent No.: US 7,992,702 B2
(45) Date of Patent: Aug. 9, 2011

(54) APPARATUS AND METHOD FOR TRANSFERRING FLEXIBLE CONTAINERS

(75) Inventors: Filippo Furlotti, Traversetolo (IT); Renato Le Brun, Parma (IT)

(73) Assignee: WILD Parma S.r.l., Collecchio (PR) (IT)

( * ) Notice: Subject to any disclaimer, the term of this patent is extended or adjusted under 35 U.S.C. 154(b) by 470 days.

(21) Appl. No.: 12/121,903

(22) Filed: May 16, 2008

(65) Prior Publication Data
US 2008/0286083 A1 Nov. 20, 2008

(30) Foreign Application Priority Data

May 18, 2007 (IT) .............................. PR2007A0037

(51) Int. Cl.
*B65G 47/00* (2006.01)
(52) U.S. Cl. .............. 198/474.1; 198/377.01; 198/476.1
(58) Field of Classification Search ............... 198/470.1, 198/474.1, 476.1, 477.1, 377.01, 377.03, 198/379
See application file for complete search history.

(56) References Cited

U.S. PATENT DOCUMENTS

| | | | | |
|---|---|---|---|---|
| 2,415,997 A * | 2/1947 | Eldred | .................. | 198/343.2 |
| 2,643,778 A * | 6/1953 | Socke | .................. | 198/377.04 |
| 3,770,098 A * | 11/1973 | Baugnies et al. | ........ | 198/377.03 |
| 3,837,141 A | 9/1974 | Lorieux | | |
| 3,847,273 A * | 11/1974 | Buhayar | .................. | 198/377.07 |
| 4,569,183 A * | 2/1986 | DeSantis | .......................... | 53/534 |
| 6,345,713 B1 * | 2/2002 | Ronchi | .................... | 198/377.03 |
| 7,275,633 B2 * | 10/2007 | Zimmermann | ............ | 198/474.1 |

FOREIGN PATENT DOCUMENTS

| | | |
|---|---|---|
| EP | 1 041 034 | 10/2000 |
| FR | 2 494 237 | 5/1982 |
| GB | 220 169 | 8/1924 |

OTHER PUBLICATIONS

European Search Report from the European Patent Office for European Patent Application No. 08 00 7783 dated Aug. 8, 2008.

* cited by examiner

*Primary Examiner* — Douglas A Hess
(74) *Attorney, Agent, or Firm* — Stroock & Stroock & Lavan LLP

(57) ABSTRACT

An apparatus for transporting a container between stations, for example, from a rotary machine to a conveyor is provided having a rotary apparatus having a plurality of grippers constructed and arranged to receive and retain containers, a mechanism for rotating the grippers by about 90°. For example, the containers can be in a vertical position when received by the grippers and in a horizontal position when released by the grippers. A method for transporting a container between stations is provided. For example, the method can include receiving and retaining containers proximate a rotary machine and rotating the container to by about 90° proximate a conveyor and releasing the container to fall by gravity onto the conveyor.

19 Claims, 7 Drawing Sheets

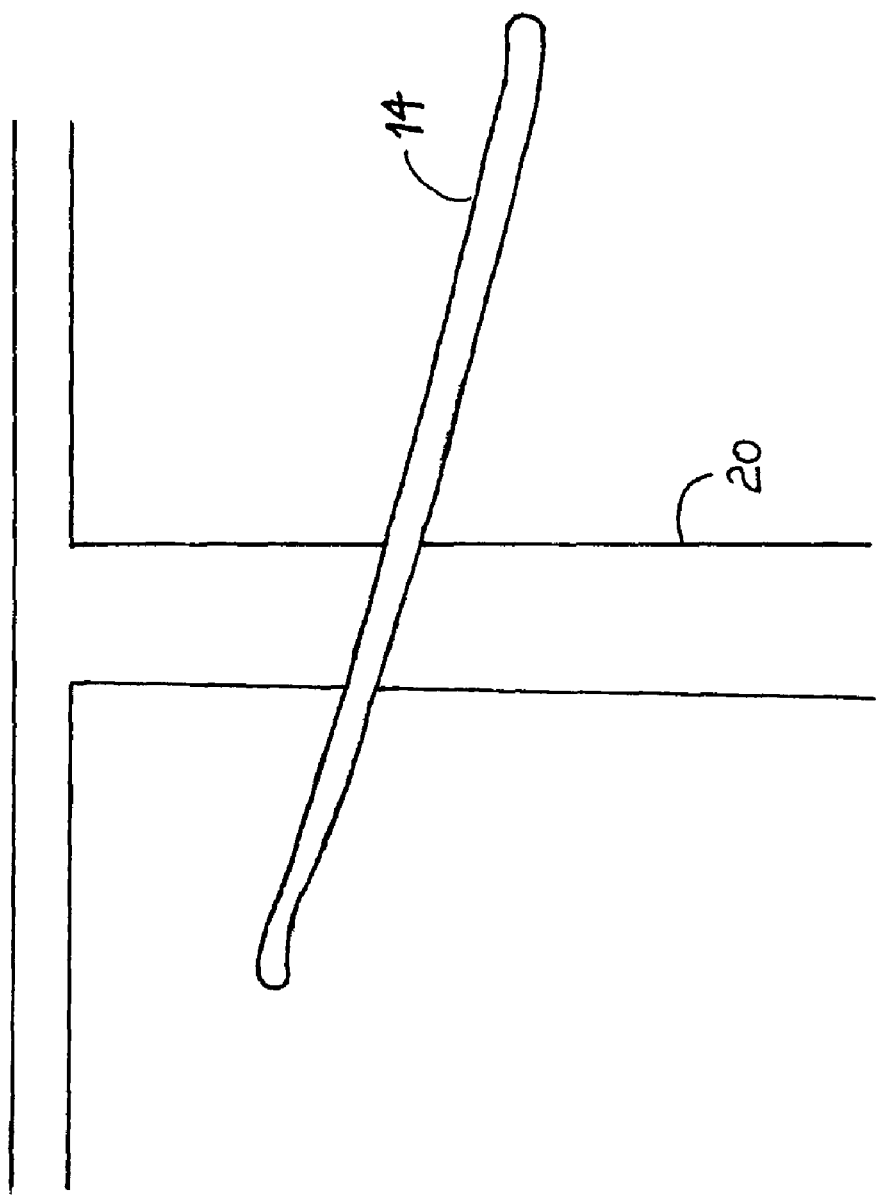

APPARATUS AND METHOD FOR TRANSFERRING FLEXIBLE CONTAINERS

BACKGROUND OF THE INVENTION

This invention relates, in general, to a system for continuously moving objects, such as flexible containers, from a station, such as a rotary machine, to another station, such as a conveyor belt.

Flexible containers often include a spout and collar, and can be transported while hanging by the collar, for example, by a rotary machine during capping. However, the flexible containers must often be transferred to an apparatus that does not grip the collar of the flexible container, such as a conveyor belt for transporting the flexible container to another station, for example, for packaging.

Additionally, flexible containers are often released from above a moving conveyor belt at heights above the conveyor belt. The flexible containers can often bounce when contacting the conveyor belt, which can result in a stream of flexible containers that are not aligned. Such an arrangement may hinder processing at the subsequent station, such as in the packaging station.

In light of the shortcomings described above, it is desirable to provide an apparatus and method for facilitating transporting objects between stations.

SUMMARY

Generally speaking, the present invention is directed toward an apparatus for transporting a container between stations. For example, an apparatus can transport a container from a rotary machine to a conveyor, such as a conveyor belt. An exemplary embodiment includes a rotary apparatus having a plurality of grippers constructed and arranged to receive and retain containers, for example, within one or more jaws. The rotary apparatus can include a mechanism for rotating the grippers by about 90°. For example, the containers can be in a vertical position when received by the grippers from the rotary machine, and in a horizontal position when released by the grippers from above the conveyor. Preferably, the containers fall onto the conveyor via gravity.

A method for transporting a container between stations is also provided. An embodiment of the method can include receiving and retaining containers proximate a rotary machine and rotating the container to by about 90° proximate a conveyor and releasing the container to fall by gravity onto the conveyor.

An object of the invention is to provide an improved apparatus for transporting containers as described herein.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE FIGURES

For a fuller understanding of the invention, reference is had to the following description, taken in connection with the accompanying drawings, in which:

FIG. 7 is a side view of a guide in accordance with an embodiment of the invention.

DETAILED DESCRIPTION

Figure 1:
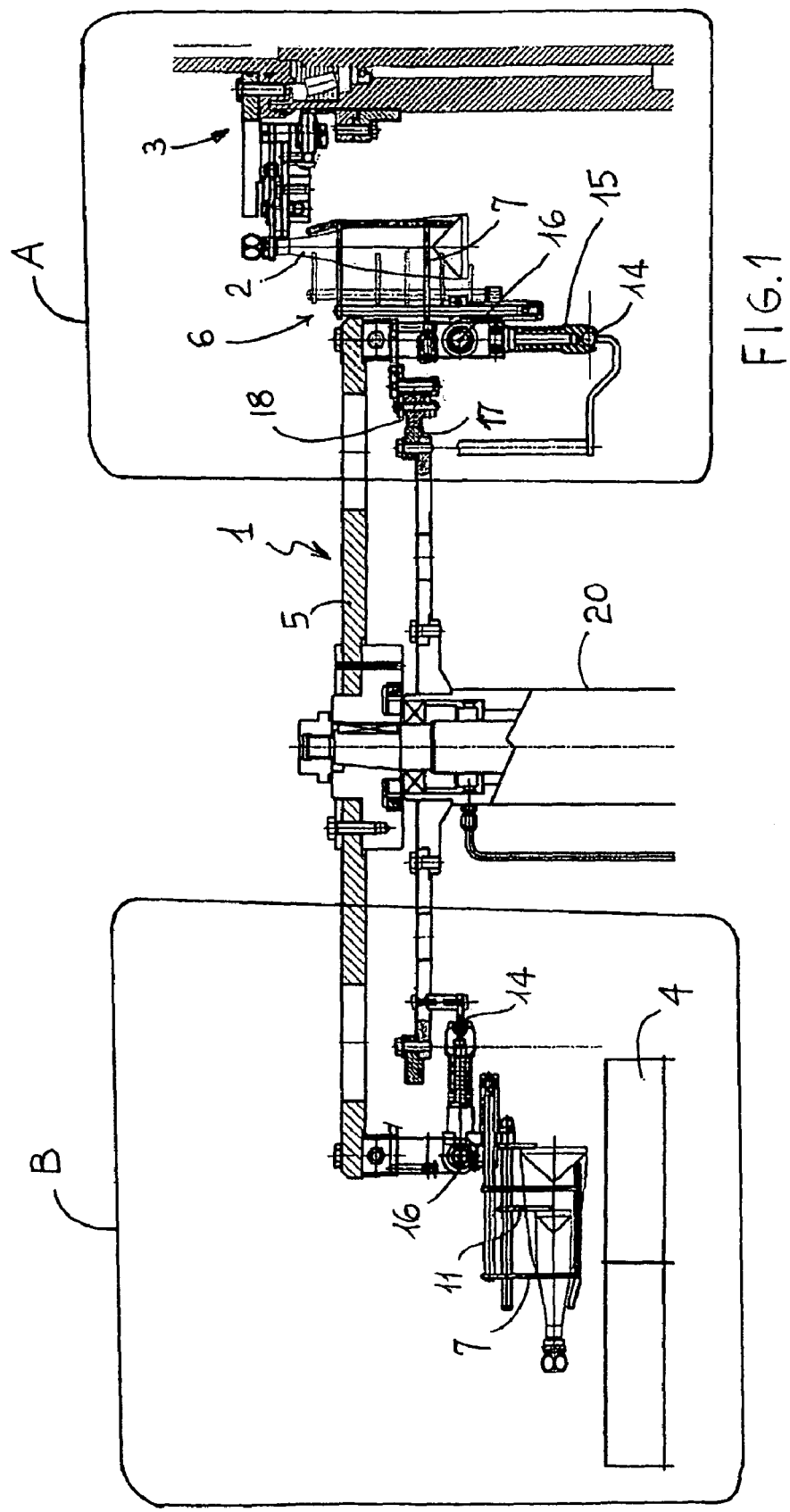
FIG. 1 is a cross sectional view of a portion of a transfer apparatus in accordance with an embodiment of the invention.

Reference is made to FIGS. 1-7, wherein an embodiment of an apparatus 1 for transferring an object are shown as transferring a container 2 from a rotary machine 3 to a conveyor 4. By way of non-limiting example, rotary machine 3 can include a capper, and conveyor 4 can include a linear conveyor belt, as shown. Examples of containers 2 can include flexible containers, for example, envelopes, foil bags, etc. preferably having a spout. Such flexible containers 2 are often referred to as "pouches." Containers 2 can preferably be manipulated and transported proximate the spout, for example, proximate a collar 8 of the spout.

Figure 2:
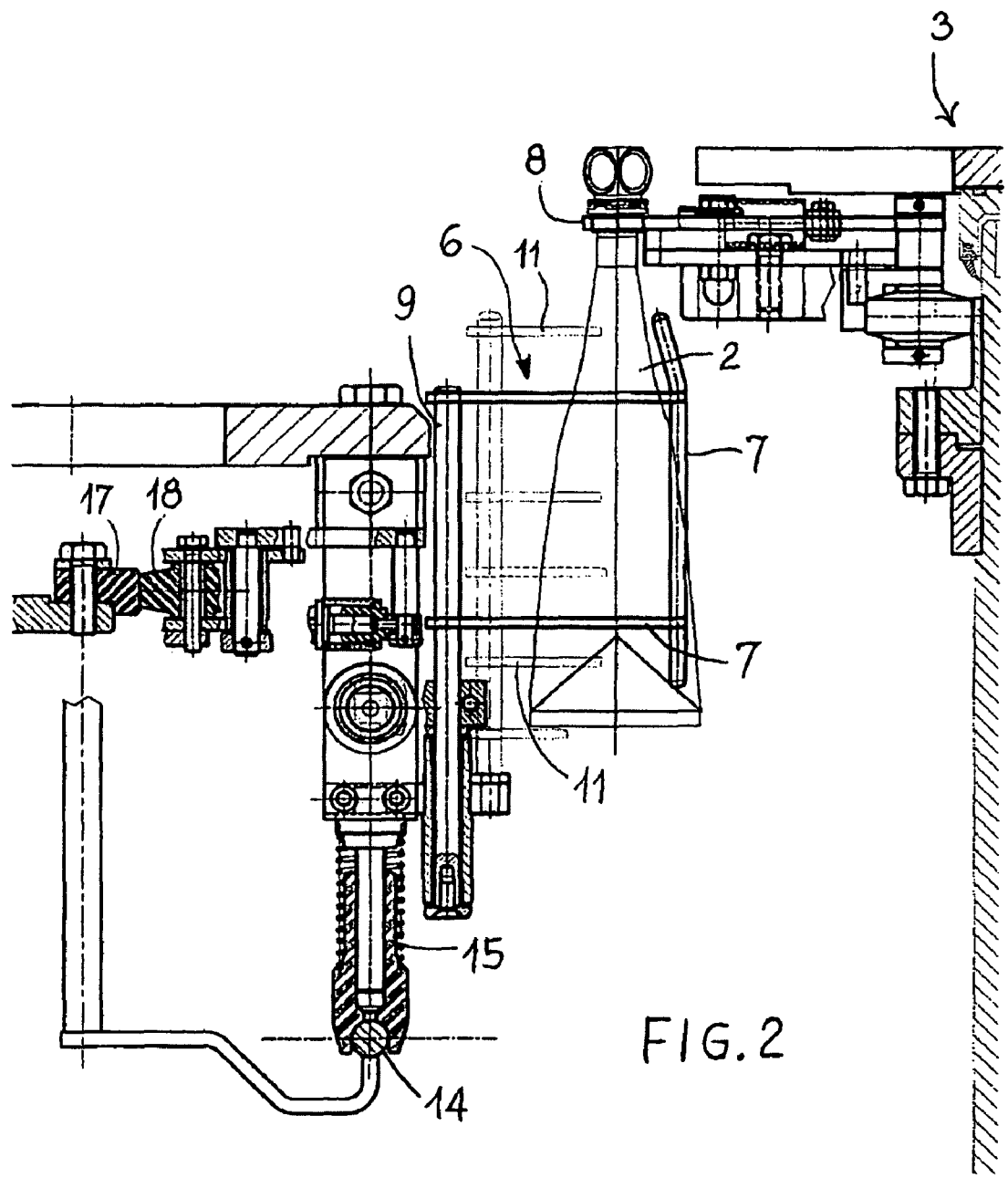
FIG. 2 is an enlarged view of area A of FIG. 1.
Figure 3:
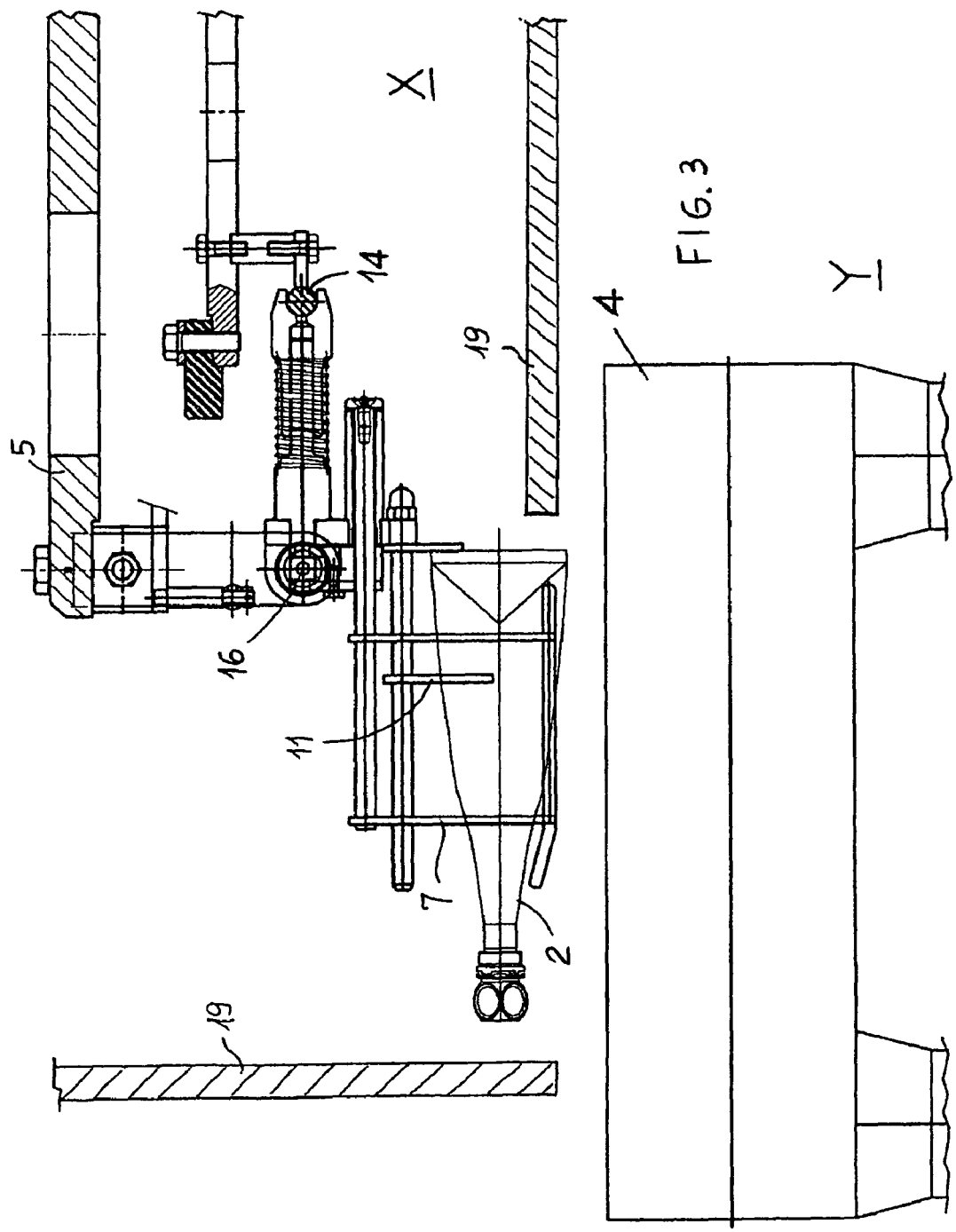
FIG. 3 is an enlarged view of area B of FIG. 1.
Figure 4:
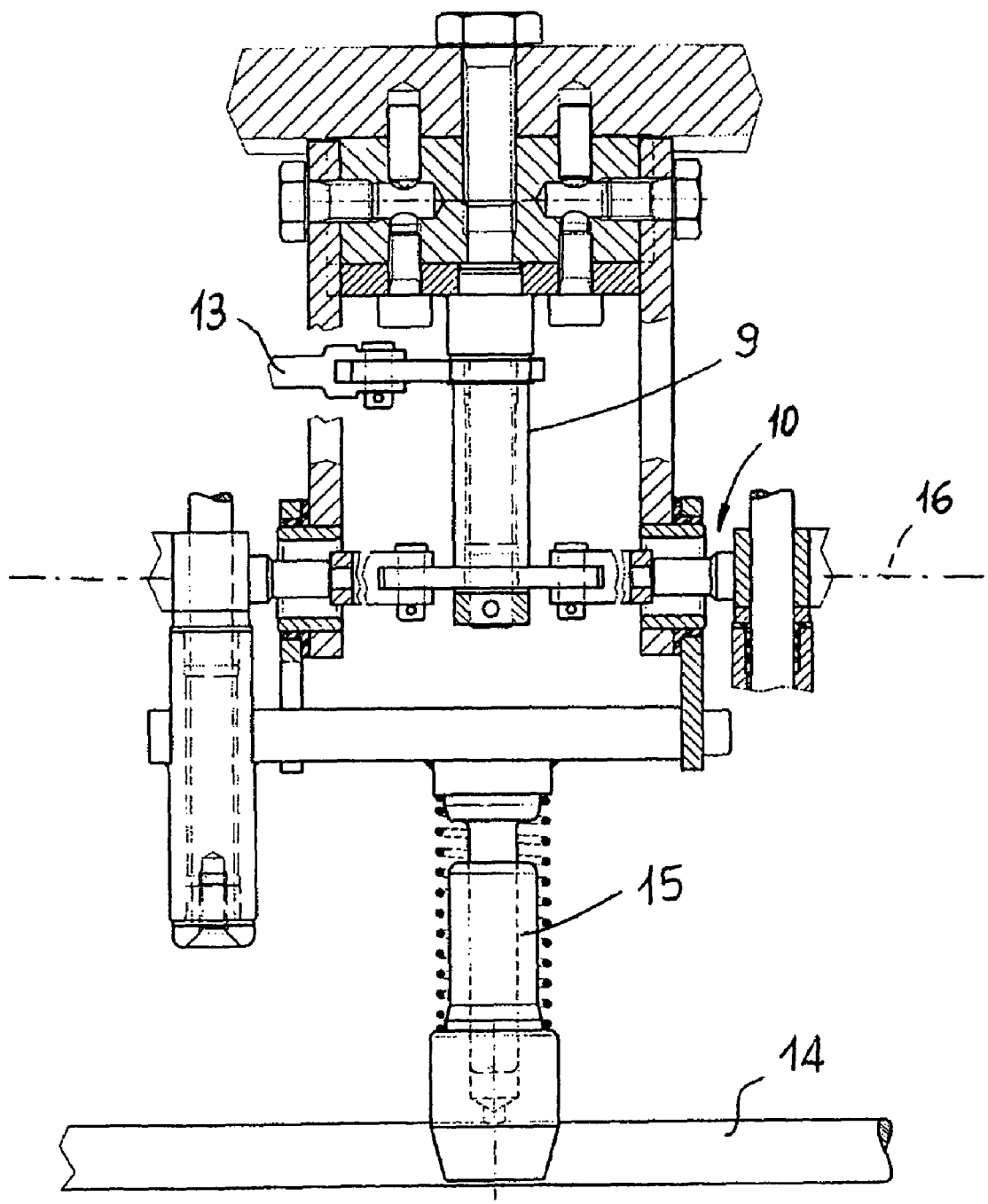
FIG. 4 is a side view of area A of FIG. 1.
Figure 5:
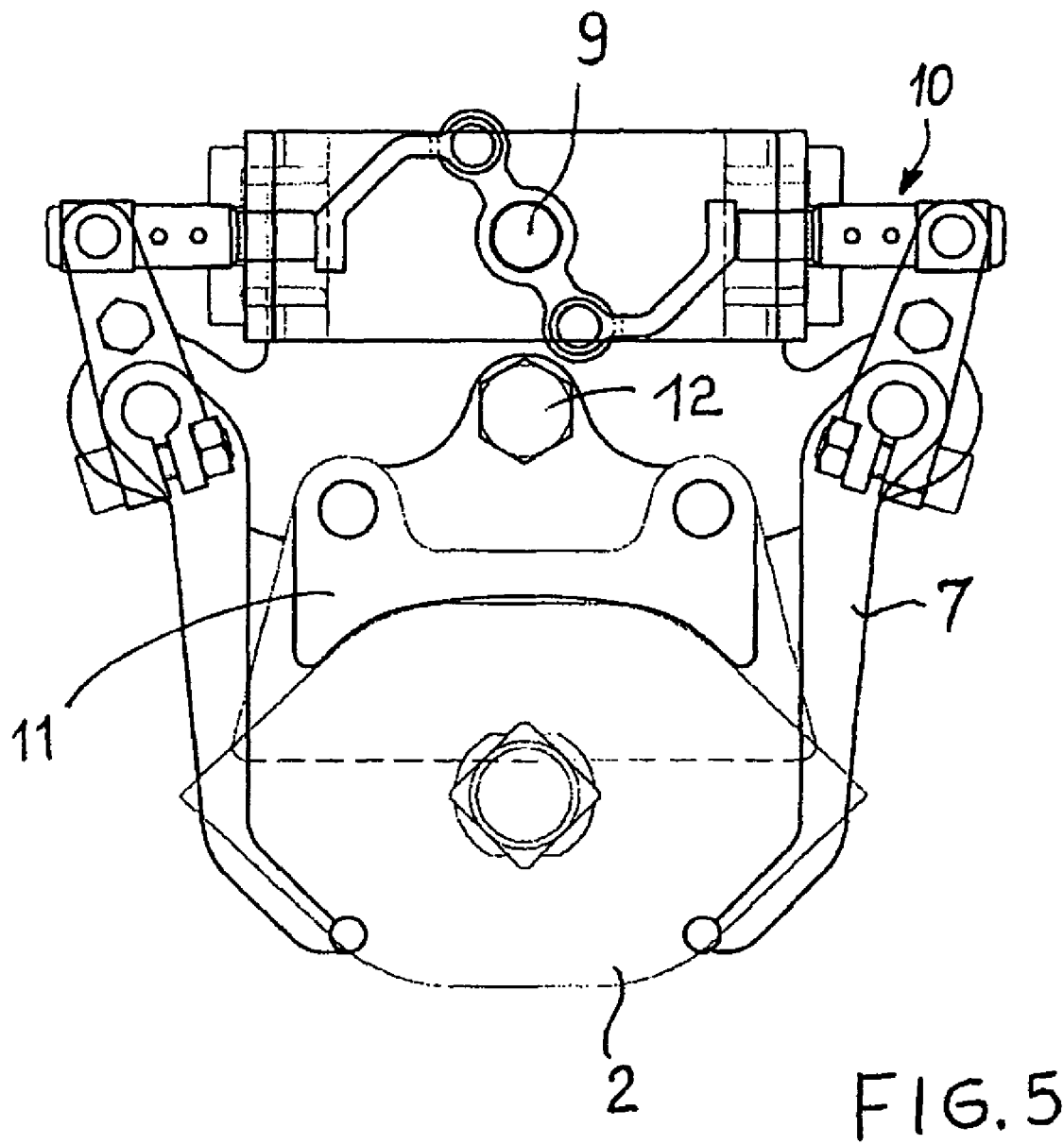
FIG. 5 is a top view of a gripper in a closed position in accordance with an embodiment of the invention.
Figure 6:
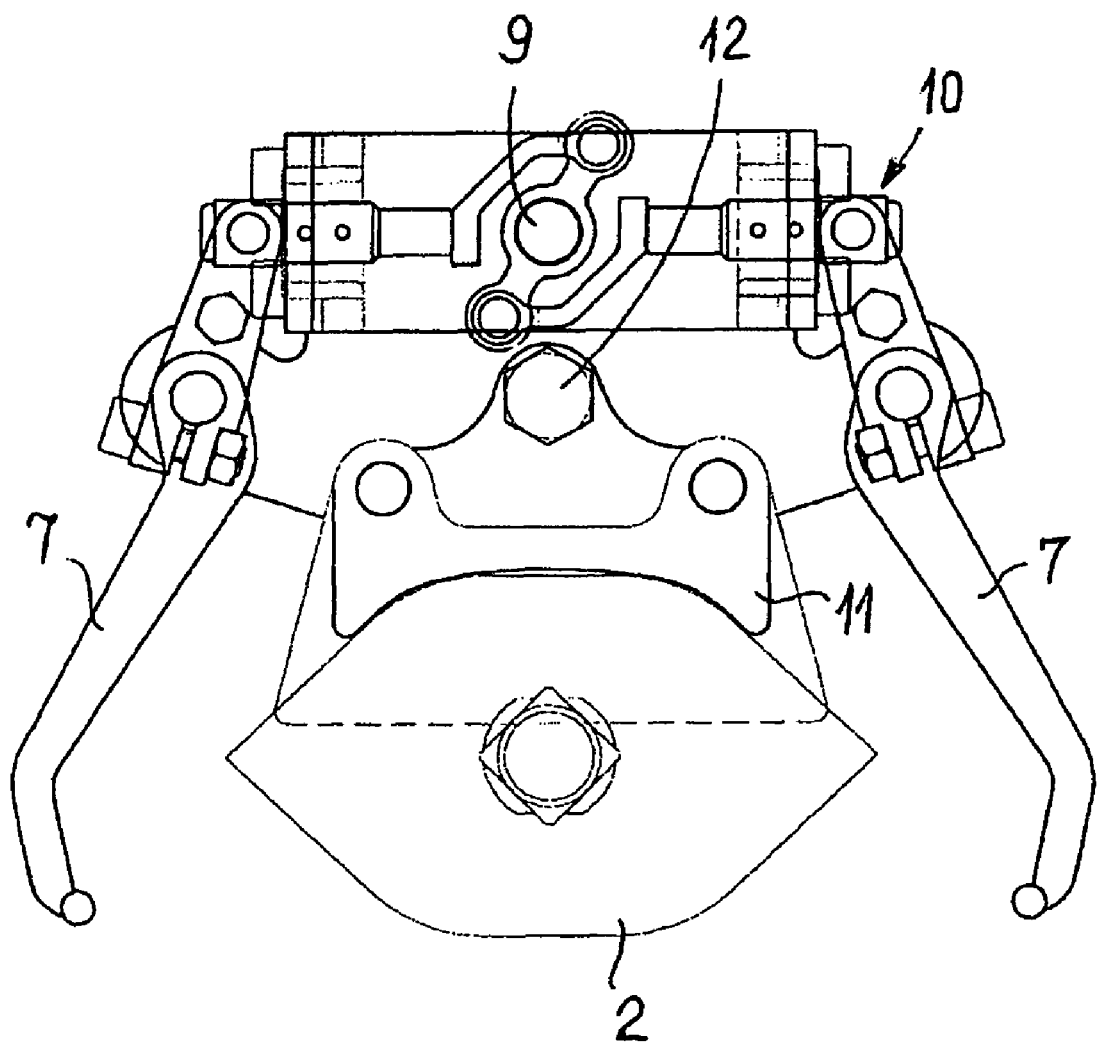
FIG. 6 is a top view of the gripper of FIG. 5 in a closed position.

Referring to FIGS. 1-3, apparatus 1 can include a platform 5 having a plurality of grippers 6 each having one or more jaws 7 constructed and arranged to grip containers 2. Preferably, jaw 7 grips containers 2 at the body of containers 2 rather than only gripping collar 8. As shown in FIGS. 5-6, jaw 7 of gripper 6 can open to receive container 2 and close to retain container 2 within jaw 7. FIG. 5 shows an embodiment of jaw 7 in an open position for receiving container 2. FIG. 6 shows an embodiment of jaw 7 in an open position for retaining container 2 within jaw 7. Preferably, jaws 7 can wrap around the body of container 2 below the cap of container 2.

As apparatus 1 rotates, proximate rotary machine 3, a cam 17 preferably engages a wheel 18 to actuate a transmission 13. Wheel 18 is preferably connected to transmission 13 via a rotodial pair and a shaft 9. Transmission 13 preferably rotates shaft 9, which can activate a lever mechanism 10 for opening and closing one or more, preferably two jaws 7. As illustrated in FIGS. 5-6, the rotation of shaft 9 in a first direction can result in jaws 7 opening, and the rotation of shaft 9 in a second, preferably opposite, direction can result in jaws 7 closing. Jaws 7 can move along a substantially horizontal plane when receiving container 2, and container 2 can be positioned substantially vertically.

Referring to FIGS. 2 and 6, one or more supporting members, such as pads 11, can be provided to facilitate retaining container 2 in the desired position with respect to jaw 7. As shown in FIG. 6, pads 11 can include a concave receiving area substantially coinciding with the shape of the wall of container 2 facing apparatus 1. Pads 11 are preferably selectively removable. For example, used pads 11 that are worn out can be replaced with new pads. Alternatively, different pads 11 can be provided having different shapes, sizes, material, etc. to accommodate differently shaped containers 2. FIG. 6 shows an embodiment of the invention having a screw 12 which can retain pads 11 in place with respect to apparatus 1. Once screw 12 is removed, pads 11 can be removed.

While being retained within jaws 7, apparatus 1 preferably rotates, thus removing container 2 from rotary machine 3. In the embodiment shown, container 2 is moved to conveyor 4. Preferably, while being transported from rotary machine 3 to conveyor 4, container 2 is rotated, preferably by about 90 degrees. For example, as shown in FIGS. 1-2, container 2 can be in a vertical position at rotary machine 3. When container 2 reaches conveyor 4, container is in a horizontal position, all the while remaining retained within jaw 7, as shown in FIGS.

1 and 3. Preferably, jaw 7 is constructed and arranged to at least partially wrap around the body of container 2 to retain container 2 within jaw 7 when rotated to the position shown in FIG. 3, more particularly, when jaw 7 is facing downward. Accordingly, jaws 7, and thus grippers 6, preferably also rotate by about 90 degrees while moving between rotary machine 3 and conveyor 4.

Grippers 6 preferably includes an axis 16 and a pivoting member 15, pivoting member 15 preferably fixed to jaws 7 such that when pivoting member 15 pivots about axis 16, jaws 7 also pivots about axis 16. Referring to FIG. 1, pivoting member 15 is preferably rotatably and slidably connected to a rod 14 extending around the core 20 of apparatus 1 about which apparatus 1 rotates. It is to be understood that rod 14 can be varied or replaced without deviating from the scope of the invention. For example, a guide rail or other mechanism which provides for the pivoting motion of pivoting member 15 about axis 16 as pivoting member 15 rotates about core 20 can be provided as a matter of application specific design choice.

The distance between rod 14 and core 20 preferably varies, as shown in FIGS. 1 and 7. Preferably, the distance between rod 14 and core 20 is greater proximate rotary machine 3 than proximate conveyor 4. Additionally, the height of rod 14 with respect to platform 5 can also vary. Preferably, rod 14 proximate rotary machine 3 is further away from platform 5 than proximate conveyor 4.

Therefore, as pivoting member 15 slides along rod 14 from rotary machine 3 toward conveyor 4, pivoting member 15 can pivot about axis 16 toward core 20. Preferably, rod 14 is fixed with respect to core 20, whereas grippers 6 rotate about core 20. Referring to FIG. 1, as pivoting member 15 pivots about axis 16, container 2 retained within jaws 7 can pivot from a vertical position proximate rotary machine 3 to a horizontal position conveyor 4.

Proximate conveyor 4, jaws 7 can open and thus release container 2. As apparatus 1 continues to rotate, pivoting member 15 preferably pivots about axis 16 away from core 20 until jaws 7 are in a vertical position again and ready to receive another container. In accordance with an exemplary embodiment, apparatus 1 is a rotary apparatus and permits continuous rotation of grippers 6 about core 20. Therefore, as rotary machine 3 continuously provides containers 2 in a vertical position, apparatus 1 can continuously remove containers 2 from rotary machine 3 and transport them to conveyor 4. Such an apparatus may expedite the process of transporting containers between the station, more particularly when the placement of containers 2 on conveyor 4 affects the speed of subsequent processing of containers 2.

Preferably, the distance between container 2 and conveyor 4 is less than about 50 mm. Such a distance may prevent container 2 from bouncing on conveyor 4 as container 2 is released. More preferably, the distance between container 2 and conveyor 4 is less than about 20 mm, most preferably less than about 15 mm.

When the distance is less than or about the thickness of container 2, it may be preferable for grippers 6 to be positioned above conveyor 4 such that as container 2 advances downstream on conveyor 4, container 2 does not contact gripper 6. In accordance with an exemplary embodiment, grippers 6 can pivot about axis 16 simultaneously with jaws 7 opening to release container 2 above conveyor 4. Therefore, the downstream portion of jaws 7 is preferably lifted above and away from conveyor and thus container 2, thus facilitating the downstream flow of container 2 on conveyor 4. Such an arrangement is preferably facilitated by a lever mechanism 10 operating about the center of rotation of axis 16.

Referring to FIG. 1, the arrangement of an exemplary embodiment of apparatus 1 provides an aseptic technology. By way of non-limiting example, platform 5 connected to grippers 6 which rotate about core 20 and transports containers 2 from rotary machine 3 to conveyor 4 can always remain in a sterile area X. Conveyor 4 can always remain in a non-sterile area Y, and preferably avoids contaminating the sterile area X. Preferably, one or more barriers 19 are provided to separate the sterile area X from non-sterile area Y. Therefore, containers 2 which are released from jaws 7 onto conveyor 4 are preferably the only breach between sterile area X and non-sterile area Y.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the grippers can include various mechanisms for receiving and retaining the container, by way on non-limiting example, suction mechanisms which can apply a suction force to receive and retain the container and stop the suction force to release the container. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. An apparatus for transporting flexible containers from a rotary machine to a conveyor, the apparatus comprising:
    a plurality of gripping assemblies, each gripping assembly having a pivoting member and one or more jaws constructed and arranged to receive and retain a container, the jaws being selectively movable between an open position and a closed position, wherein the jaws can receive or release the container when the jaws are in the open position, and the jaws can retain the container when the jaws are in the closed position, and wherein the jaws have a receiving position and a releasing position;
    a first rotating assembly constructed and arranged to rotate the gripping assemblies about a first axis;
    the gripping assemblies being constructed and arranged to rotate the jaws 90° about a second axis between the receiving position and the releasing position, the second axis being perpendicular to the first axis; and
    a rod;
    the pivoting member being connected to the jaws such that when the pivoting member pivots about the second axis, the jaws pivot about the second axis;
    the pivoting member being displaceable rotatably around the rod and slidably along the length of the rod;
    the rod extending around the first axis;
    the rod having a variable distance from the first axis and a variable height, such that as the pivoting member is displaced along the length of the rod from proximate the rotary machine toward the conveyor, the pivoting member rotates about the rod and pivots about the second axis, thus pivoting the jaws.

2. The apparatus of claim 1, further comprising a jaw actuation assembly for opening and closing the jaws, the jaw actuation assembly comprising:

a cam;

a wheel slidably connected to the cam;

a transmission connected to the wheel, the transmission connected to and selectively rotating a shaft; and a lever assembly connected to the shaft, wherein rotation of the shaft in a first direction activates the lever assembly to open the jaws, and wherein rotation of the shaft in a second direction activates the lever assembly to close the jaws.

3. An apparatus for transporting flexible containers from a first station to a second station, the apparatus comprising:

a plurality of gripping assemblies having grippers constructed and arranged to receive a container from a first station and to release the container at a second station; and a first rotating assembly constructed and arranged to rotate the gripping assemblies about a first axis; and said gripping assemblies being constructed and arranged to rotate the grippers about a second axis as the grippers rotate about the first axis between the first station and the second station, wherein the containers include a body, and the grippers contact the body to receive the container at the first station and to retain the containers while the apparatus transports the container from the first station to the second station;

wherein the grippers are constructed and arranged to receive containers in a vertical position and to release the containers in a horizontal position;

wherein the grippers receive the containers from a rotary machine at the first station;

wherein the grippers release the containers above a conveyor at the second station, the containers being permitted to fall onto the conveyor via gravity.

4. The apparatus of claim 3, wherein the grippers are positioned proximate the periphery of the apparatus.

5. The apparatus of claim 3, wherein the gripping assemblies rotate the grippers 90° between the first station and the second station 6. The apparatus of claim 3, wherein the grippers release the containers at the second station above a conveyor at a height of less than 20 mm above the conveyor.

7. The apparatus of claim 3, wherein the gripping assemblies further comprise a selectively replaceable pad.

8. The apparatus of claim 7, wherein a first pad shaped to correspond to a first container having a first shape is replaceable with a second pad shaped to correspond to a second container having a second shape.

9. The apparatus of claim 3, further comprising:

a guide positioned about the first axis, and a pivoting member connected to the grippers such that the gripper and the pivoting member rotate about the first axis and pivots about the second axis simultaneously, the pivoting member being displaceable along the guide as the pivoting member rotates about the first axis;

the guide being constructed and arranged to urge the pivoting member to pivot about the second axis as the pivoting member rotates about the first axis.

10. The apparatus of claim 9, wherein the guide includes a rod about which the pivoting member can rotate.

11. The apparatus of claim 9, wherein the guide includes a varying distance between the guide and the first axis.

12. The apparatus of claim 9, wherein the guide includes a varying height along the first axis.

13. The apparatus of claim 3, wherein the grippers rotate via the second axis after releasing the container.

14. The apparatus of claim 3, further comprising a jaw actuation assembly for opening and closing the jaws, the jaw actuation assembly comprising:

a cam;

a wheel slidably connected to the cam;

a transmission connected to the wheel, the transmission connected to and selectively rotating a shaft; and a lever assembly connected to the shaft, wherein rotation of the shaft in a first direction activates the lever assembly to open the jaws, and wherein rotation of the shaft in a second direction activates the lever assembly to close the jaws.

15. A method for transporting a flexible container, the flexible container including a body, from a first station to a second station, the method comprising:

receiving, via one or more grippers, the flexible container in a vertical position from a providing mechanism at a first station, the one or more grippers contacting the body of the flexible container to receive the container;

rotating the flexible container from the vertical position to a horizontal position;

transporting the flexible container from the first station to a second station; and releasing the flexible container proximate a receiving mechanism at the second station, wherein the providing mechanism includes a rotary machine, wherein the receiving mechanism includes a conveyor, and wherein release the flexible container includes permitting the flexible container to fall onto the receiving mechanism via gravity.

16. The method of claim 15, wherein the receiving the container comprises wrapping one or more jaws around the container.

17. The method of claim 15, further comprising rotating the grippers after releasing the containers.

18. The method of claim 15, wherein rotating the containers comprises rotating the grippers.

19. The method of claim 15, wherein releasing the containers comprises releasing the containers from a height of less than 20 mm above the receiving mechanism.

* * * * *